Dec. 13, 1966    J. BURNHAM ET AL    3,292,054
CAPACITOR SEAL
Filed Aug. 22, 1963
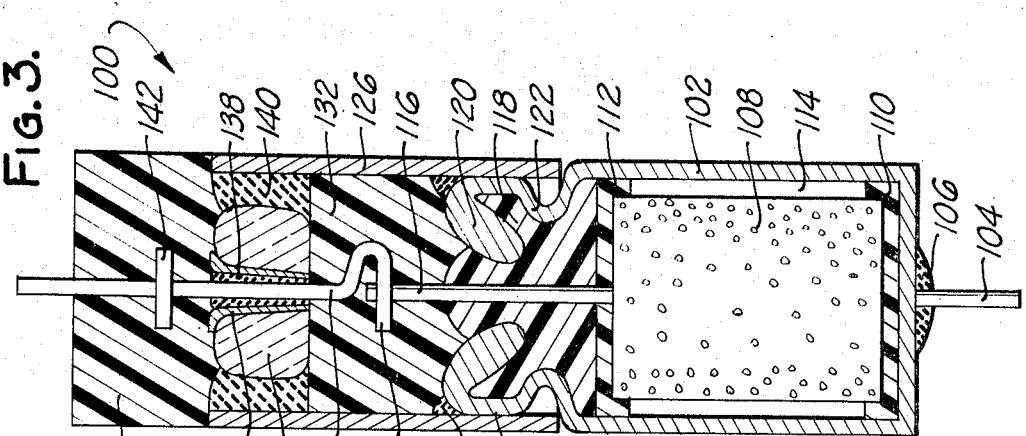
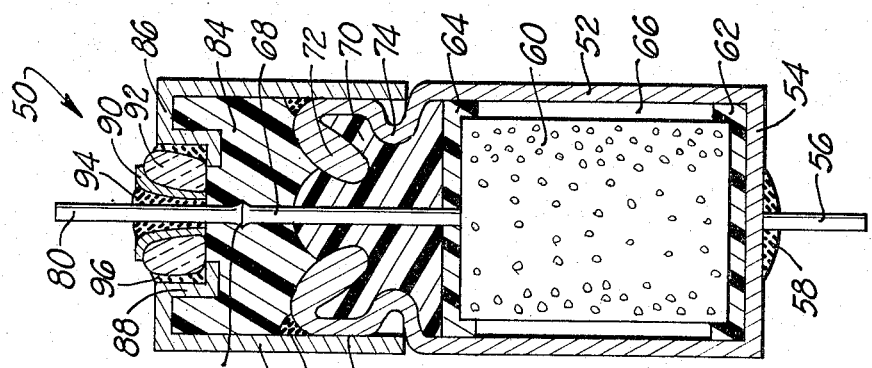
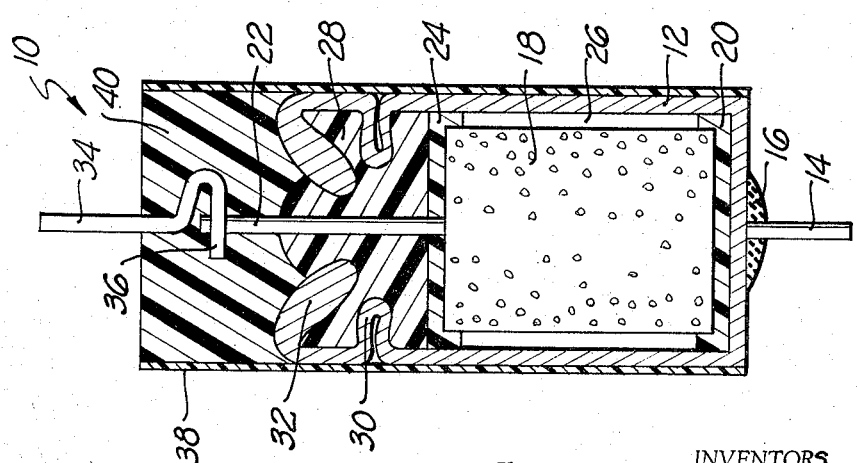
INVENTORS
JOHN BURNHAM
ROBERT I. RAMOS
NOW BY CHANGE OF NAME ROBERT I. BURNHAM
By EDWARD D. O'BRIAN
ATTORNEY United States Patent Office 3,292,054
Patented Dec. 13, 1966

3,292,054
CAPACITOR SEAL
John Burnham and Robert I. Ramos, now by change of name, Robert I. Burnham, both of Los Angeles, Calif.; said Robert I. Burnham assignor to Ti-Tal Incorporated, Santa Monica, Calif.
Filed Aug. 22, 1963, Ser. No. 303,967
2 Claims. (Cl. 317—230)

This invention is directed to novel seal constructions particularly suited for the sealing of small liquid containing electrical devices such as electrolytic capacitors.

At the present time many electrolytic capacitors are manufactured using an inert metal can serving as a housing and as an electrode. With this type of construction such a housing holds a capacitor anode and an electrolyte, the electrolyte placing the housing and the anode in electrical communication with one another. In order to insure satisfactory continued capacitor performance a seal is used in order to prevent the escape of the electrolyte from the can.

Such escape of electrolyte can be caused by a number of different factors. Electrolytic capacitors are of course used in a number of different positions and in a plurality of environments. In various positions, normal drainage might permit the electrolyte to run out of the can, were it not for this seal. Furthermore, electrolytic capacitors used in temperature extremes have a tendency toward electrolytic vaporization which is a very material factor toward loss of electrolyte. If significant amounts of electrolyte escape from an electroyltic capacitor, the performance of such a unit is affected. In addition, the electrolytes used in many types of electrolytic capacitors are of an extremely corrosive character. Because of the corrosiveness of this type of electrolyte, leakage or escape must be prevented from such capacitors. Since leakage of electrolyte renders a capacitor ineffective, leakage must be prevented for long capacitor life.

A number of efforts have been made to provide satisfactory seals for electrolytic capacitors. It is quite common at the present time to form electrolytic capacitors using flanges and washers which are deformed against one another so as to create a seal. Seals of this category are, as a general rule, ineffective for many applications because of the fact that the structures are bulky and add materially to the physical dimensions of the capacitor. Furthermore this type of construction is comparatively expensive to create, and unless such seals are carefully made they are subject to failure when the capacitor is subjected to temperature cycling. Past efforts along these general lines are not considered to have supplied the need for effective, inexpensive seals for electrolytic capacitors, because of the cost, size and/or performance factors.

Accordingly, it is an object of the present invention to provide new and improved capacitor seal constructions which provide a long seal life even in the presence of such adverse factors as temperature cycling.

It is another object of this invention to provide new and improved electrolytic capacitor seals which can be economically created to provide an effective protection against leakage even in adverse conditions.

It is still another object of the present invention to provide effective capacitor seals which are of nominal dimension so that they do not take up excessive space in electronic assemblies.

These and other objects of this invention as well as many advantages thereof will become more fully apparent upon a detailed consideration of the following specification and upon reference to the accompanying drawings in which:

FIGURE 1 is a partial cross section of a capacitor employing one embodiment of the seal of this invention;

FIGURE 2 is a partial cross section of an electrolytic capacitor employing another embodiment of the seal of this invention; and FIGURE 3 is another partial cross section of an electrolytic capacitor employing a third embodiment of the seal of this invention.

In summary this invention is directed to means for the sealing of electrolytic capacitors and other small electrical devices. It comprises the use of a rubber washer in the end of the drawn capacitor case to be sealed, with the end of the case crimped and closed downwardly and inwardly to cause compression of the rubber washer for maximum sealing. In order to prevent deterioration of the rubber, to protect it from external effects and to provide further sealing, a sealing resin is cast in place over the rubber, over the crimped end of the case and around the anode lead. The exterior of the casting is defined by a sleeve slipped over at least a portion of the capacitor case. Optionally, further sealing can be effected. For example, a metal to glass seal may be provided around the anode lead at the top of the cast protective portion. In such an embodiment, the metal to glass seal is sealed to both the anode lead and to the sleeve which is in engagement with the capacitor case. Furthermore, an additional cast seal may be placed on top of the metal to glass seal. This latter seal gives mechanical protection to the metal to glass seal and gives thermostability to prevent excessive thermal loads on the metal to glass seal.

Further understanding of this invention will be obtained by reference to the following portion of the specification wherein the structure is described in detail with reference to the drawings. Referring now to FIGURE 1, the capacitor is generally indicated at 10. The capacitor comprises a case 12 which is normally a deep drawn silver can which serves as the cathode of the capacitor. The cathode wire 14 is soldered to the bottom of the case 12 by means of solder 16. Mounted within the case 12 is an anode 18. The anode 18, in the type of capacitor herein considered, is of tantalum. The anode 18 may be a porous tantalum slug or may be wound of etched foil, or may be of any other suitable type of construction. Indeed, the case 12 need not be of silver and the anode 18 need not be of tantalum to derive the full benefits of this invention. The benefits of this inventive sealing arrangement are obtainable in any small electrical device where sealing is necessary or helpful. Accordingly this particular capacitor is described merely to show an embodiment and particular utility for the seal.

The anode 18 is spaced from the case 12 by means of an imperforate insulating spacer 20 between the end of the anode 18 and the closed end of the case 12. The insulation 20 is preferably of Teflon or of some other material of suitable dielectric strength and chemical resistance to the chemical environment. An anode lead 22 is secured to the anode 18 and is of preferably the same material as the anode. When the anode 18 is tantalum, the anode lead 22 is also made of tantalum. The anode lead 22 is secured to the anode 18 is such a manner as to be electrically connected thereto. A further insulating spacer 24 is provided between the other end of the anode 18 and the case 12 in order to hold the end of the anode carrying the anode lead 22 away from the case. Space 26 is created by having the anode 18 of smaller size than the inside size of the case 12 and it is maintained by the positioning effect of the insulation spacers 20 and 24. The space 26 contains a suitable electrolyte to give conductive effect between the case 12 and the anode 18.

A rubber washer 28 is fitted around the anode lead 22 and inside of the case 12 adjacent the Teflon insulating spacer 24 so that the anode lead 22 extends therethrough. The rubber washer 28 is distorted and compressed to provide a tight seal by forming a bead 30 inwardly around the case. This bead may be suitably formed by rotating the case 12 upon an axis generally corresponding to its leads, with respect to a beading wheel which depresses the bead 30 therein. After beading is accomplished the open end of the case 12 is turned inward and downward to form a flange 32 which further distorts and compresses the rubber washer 28. The flange 32 may be formed by crimping or by spining. In either case suitable dies are provided for the turning of the flange 32 from the original form of an open cylindrical case to the form shown. In the case of crimping there is no relative rotary motion between the case 12 and the crimping die, whereas in the case of spinning such relative rotary motion exists. In either case, the forces required to form the flange 32 are also sufficient to cause collapse of the bead 30 to the form shown in FIGURE 1 for further compression and distortion of the rubber washer 28 for maximum sealing.

An anode lead extension 34 is secured to the anode lead 22 by the formation of a tee 36 on the extension 34, which tee is welded or soldered to the anode lead 22. While butt welding of a lead extension to the lead 22 is feasible, the use of tee 36 provides a strong anchor for both the anode lead 22 and the anode extension 34 within the capacitor seal. A sleeve 38 is mounted over at least a portion of the length of the capacitor case 12 and extends away therefrom on the end associated with the anode lead 22 and extends at least as far in that direction as past the tee 36. The sleeve 38 may be made of conductive or non-conductive material and is preferably made of polyester or some other suitable inert dielectric. The space within the open end of the sleeve 38 is filled with a castable dielectric resin 40, such as epoxy. By this construction a double seal is provided for the resin 40 closely embraces the anode lead 22, the case 12 at the flange 32 and the compressed and distorted rubber washer 28.

In the embodiment of FIGURE 2, a similar capacitor 50 is shown. The capacitor of FIGURE 2 has a silver case 52 which is again in the form of a drawn cylindrical cup having an integral bottom 54 the cathode lead 56 is attached to the bottom 54 of the case 52 by means of a solder junction 58. Within the case 52 is positioned a tantalum anode 60 which is positioned away from the sides of the case 52 and the bottom 54 by means of a bottom spacer 62 and a washer 64. As previously described the tantalum anode 60 may be of the porous slug variety or of other construction. The seal of this embodiment may be employed with capacitors using material other than silver and tantalum. The spacer 62 and washer 64 are preferably of Teflon, but may be constructed of some other suitable dielectric and chemically resistant material. Space 66 is filled with electrolyte composition to permit the functioning of the unit as a capacitor.

Anode lead 68 is preferably of the same material as the anode 60, in this case tantalum. The anode lead 68 is connected to the anode 60 and passes through a hole in the washer 64. Positioned around the anode lead 68 is a rubber washer 70. The top of the case 52 is turned inward and downward to form a flange 72 which is turned into the rubber washer 70 to compress and distort it. The flange 72 may be formed by spinning or by crimping, the distinction between these two forms of operation being that in spinning there is relative rotary motion about the axis of the anode between the case 52 and the tool acting upon the flange 72. In the case of crimping, there is no such relative rotary motion. After the flange 72 is formed, a beading wheel is pressed against the side of the case 52 during relative rotary motion of the case 52 and the beading wheel. This beading wheel is positioned along the case 52 to form a bead 74 therein at the rubber washer 70 to further distort and compress the rubber thereof. Since the flanging and the beading steps are performed in this order, the bead 74 is not collapsed as in the embodiment of FIGURE 1, but it is understood that in the embodiment of FIGURE 1, the bead 30 may be uncollapsed if desired, and in the embodiment of FIGURE 2 the bead 74 may be collapsed, if desired.

After the beading and flanging operation, the portion of the case 52 above the bead 74 is further spun to provide a reduced diameter 76 for insertion of sleeve 78 thereover. Sleeve 78 is of such inside and outside diameter so that it fits snugly on the reduced diameter 76 and its outside diameter corresponds to the outside of the case 52. If desired, the sleeve 78 is soldered as at 79 or otherwise secured in position on case 52. Anode lead extension 80 is butt welded at 82 to the anode lead 68 in such a manner as to cause an enlargement at the weld for anchoring purposes. Alternatively, a tee, such as shown in FIGURE 1, could be used to secure the anode lead extension 80 to the anode lead 68 and to provide a suitable anchor therefor. The sleeve 78 is filled with a castable dielectric resin 84 such as epoxy.

The top of the sleeve 78 is closed by means of a metal to glass seal. If the seal is of large diameter, that can be secured directly to the outer walls of the sleeve 78. However, if the seal is of small diameter, the sleeve 78 may be provided with a top 86 containing a drawn cup 88 in which the metal to glass seal is secured, as is shown. The metal to glass seal comprises a metal eyelet 90 having a glass sealing element 92 secured thereto. The glass is of special character, in that it is solderable. The eyelet 90 and the glass seal 92 are mounted around the anode lead extension 80 and within the cup 88, and are soldered thereto. Solder 94 secures the metal eyelet 90 to the anode lead extension 80, and solder 96 secures the glass seal 92 to the cup 88.

By means of this construction, a triple seal is provided. Firstly, the compressed and distorted rubber washer 70 seals between the anode lead 68 and the case 52. Secondly, the resin 84 seals between the anode lead 68, anode lead extension 80, the flange 72 and the sleeve 78. Thirdly, the glass seal 92 seals between the anode lead extension 80 and the sleeve 78. The unit is mechanically stable for the anchoring effect of the weld 82 reduces the strain on the glass seal 92 resulting from mechanical forces on the anode lead extension 80.

In FIGURE 3, another embodiment of the multiple seal of this invention is shown. The capacitor 100 shown therein again includes a silver case 102 in the form of a cylindrical drawn cup which acts as the capacitor cathode. The cathode lead 104 is secured thereto by means of solder 106. Mounted within the case 102 is tantalum anode 108 which again may be of the porous slug or other variety. The anode 108 is positioned within the case 102 by means of spacer 110 and washer 112 so as to provide a space 114 therebetween. A suitable electrolyte is placed within the space 114 to provide capacitive action of the assembly. The spacer 110 and washer 112 are of dielectric material, and are of such composition as to resist the chemical reaction of the electrolyte in space 114. Since the particular capacitor is merely illustrative environment for the seal embodiment of this invention, it is clear that the seal is useful in other environments.

A tantalum anode lead 116 is electrically secured to the anode 108 and passes through a suitable hole in the washer 112. The anode lead 116 is normally of tantalum, when the anode 108 is of tantalum. A rubber washer 118 is positioned within the case 102 and around the anode lead 116. As in the embodiment of FIGURE 2, a flange 120 is crimped or spun inwardly and downwardly to compress and distort the rubber washer 118. Furthermore a bead 122 is formed in the case 102 by means of relative rotary motion of the case and a beading wheel. If desired, as in the embodiment of FIGURE 1, the flange 120 can be formed after the bead 122 whereupon the bead 122 will be collapsed as is shown therein. After flanging and beading, the open end of the case 102 is reduced in diameter at 124 to further distort and compress the rubber wasehr 118 and to permit the installation of a sleeve 126 thereover.

Anode lead extension 128 is formed with a tee 130 thereon. The tee 130 is welded or soldered to the anode lead 116 to provide an extension thereto, to change anode lead materials, and to provide an anchor for both the anode lead 116 and the anode lead extension 128. The sleeve 126 is of such inside diameter as to fit upon the reduced diameter 124, and is of such exterior diameter so as to preferably correspond with the outside diameter of the case 102. The sleeve 126 may be secured to the case 102 by soldering as at 127, if desired. The sleeve 126 is partially filled with a castable dielectric resin 132, such as epoxy so as to enclose the tee 130 therein.

Above the resin 132 and within the sleeve 126 a metal to glass seal is provided. The metal to glass seal comprises a metallic eyelet 134 to which is secured glass bead 136, the eyelet 134 surrounds the anode lead extension 128 and is secured thereto by means of solder 138. The glass bead 136 is secured by means of solder 140 to the interior of the sleeve 126. Cross bar 142 is secured transversely to the anode lead extension 128 so as to furnish a further anchor for the anode lead extension. The cross bar 142 is preferably the same material as the extension 128, such as nickel wire, and is preferably welded thereto. Further castable resin 144 is molded around the anode lead extension 128 and the cross bar 142 to securely anchor the cross bar 142 therein. Resin 144 is preferably of the same character as the resin 132, so it has the same thermal expansion properties.

It can be seen from FIGURE 3 that this embodiment of capacitor seal provides four separate sealing means to seal the electrolyte in the capacitor case 102. It is seen however that the sealing means are of general utility and are useful in the sealing of other small electrical devices. The first seal comprises the compressed and distorted rubber washer 118 which intimately embraces both the anode lead 116 and the case 102. The second seal comprises the resin 132 which embraces the sleeve 126, the case 102, the rubber washer 18, anode lead 116 and anode extension 128. The third seal comprises the metal to glass seal which is sealed to both the sleeve 126 and the anode lead extension 128. The fourth seal comprises the resin 144 which is in intimate sealing engagement with the sleeve 126, the metal to glass seal and the anode extension 128. Since the resin 132 and the resin 144 have the same thermal properties, and since anchors are provided in both by means of the tee 130 cross bar 142, changes in temperature and consequent changes in dimension of the resin 132 and resin 144 do not excessively load the metal to glass seal, for these thermal loads balance one another to eliminate excessive structural stress upon the metal to glass seal. Such balanced loading also reduces the stress on the tee 130 which consequently reduces the stress between the anode lead 116 and the anode 108.

From the above description, it can be seen that three embodiments of a novel and useful seal are disclosed. In each case a plurality of seals close the open end of a metallic case and prevent the escape of fluid therefrom. It can be seen from this disclosure that numerous embodiments and modifications of this invention are possible within the routine skill of those skilled in the art. Accordingly, the scope of this invention is defined by the scope of the following claims.

We claim:
1. An electrolytic capacitor having a seal, said electrolytic capacitor comprising:
   a case having a closed bottom and walls extending to an open top, said walls having an interior and an exterior, said case being metallic and forming the cathode of said capacitor, an anode within said case, spacing means between said anode and said case so that said anode is spaced from said case, an electrolyte within said case between said anode and said walls of said case, an anode lead electrically connected to said anode and extending out of said open end of said case;
   a resilient seal member in engagement with said anode lead and said case adjacent the open end of said case, said case having an inwardly directed flange at its open end, said inwardly directed flange being positioned in said resilient seal material so as to cause and maintain distortion and compression of said resilient seal material to maintain said resilient seal material in contact with said anode lead and with said walls of said case;
   a metallic sleeve engaging at least a portion of said exterior of said walls of said case, metal sealingly engaged with said sleeve and with said walls of said case to seal said sleeve with respect to said case, said sleeve extending beyond the open end of said case;
   an anode lead extension secured to said anode lead so as to define a joint therebetween, said joint being positioned within said sleeve and providing electrical continuity between said anode lead and said anode lead extension, said joint being of larger dimension than said anode lead extension;
   a relatively rigid seal material within said sleeve, said relatively rigid seal material being in sealing engagement with said sleeve, said case, said resilient seal material, said anode lead, said joint and said anode lead extension so as to accomplish sealing and anchoring of said joint;
   a glass seal positioned around said anode lead extension, metal sealed to said glass seal and to said sleeve, and metal sealed to said anode lead extension and said glass seal whereby sealing of the open end of said case is accomplished; and
   an anchor formed on said anode lead extension adjacent said glass seal on the side of said glass seal away from said anode; and
   a relatively rigid seal material positioned on said anode lead extension so as to engage said anode lead extension, said anchor and said glass seal.

2. The electrolytic capacitor of claim 1 wherein said flange is substantially thicker than said side walls of said case.

References Cited by the Examiner

UNITED STATES PATENTS

| | | | |
|---|---|---|---|
| 2,113,405 | 4/1938 | Junken | 317—230 |
| 2,224,307 | 12/1940 | Linder | 317—260 X |
| 2,834,926 | 5/1958 | Booe | 317—230 |
| 2,851,642 | 9/1958 | Schaeren | 317—230 |
| 3,019,376 | 1/1962 | Kurland et al. | 317—242 |
| 3,056,072 | 9/1962 | Schroeder et al. | 317—230 |
| 3,081,374 | 3/1963 | Burch | 174—52 |

FOREIGN PATENTS

| | | |
|---|---|---|
| 210,974 | 9/1960 | Austria. |
| 1,182,984 | 1/1959 | France. |
| 584,862 | 1/1947 | Great Britain. |

LARAMIE E. ASKIN, *Primary Examiner.*

JOHN F. BURNS, ROBERT K. SCHAEFER, E. JAMES SAX, *Examiners.*